(12) United States Patent
Ye et al.

(10) Patent No.: US 10,344,866 B2
(45) Date of Patent: Jul. 9, 2019

(54) SEAL ASSEMBLY FOR ABRASION RESISTANT BEARING OF CENTRIFUGAL PUMP

(71) Applicant: Baker Hughes Incorporated, Houston, TX (US)

(72) Inventors: Zheng Ye, Claremore, OK (US); Mike A. Swatek, Claremore, OK (US); Risa Rutter, Claremore, OK (US); Jimmy J. Donnell, Bixby, OK (US); Ryan P. Semple, Owasso, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 289 days.

(21) Appl. No.: 15/410,382

(22) Filed: Jan. 19, 2017

(65) Prior Publication Data

US 2017/0241428 A1 Aug. 24, 2017

Related U.S. Application Data

(60) Provisional application No. 62/298,148, filed on Feb. 22, 2016.

(51) Int. Cl.
*F04D 29/22* (2006.01)
*F04D 29/12* (2006.01)
(Continued)

(52) U.S. Cl.
CPC ............ *F16J 15/3284* (2013.01); *F04D 1/06* (2013.01); *F04D 13/10* (2013.01); *F04D 29/0413* (2013.01); *F04D 29/0473* (2013.01); *F04D 29/086* (2013.01); *F04D 29/106* (2013.01); *F04D 29/12* (2013.01);
(Continued)

(58) Field of Classification Search
CPC ... F16J 15/3284; F04D 29/628; F04D 29/106; F04D 29/086; F04D 29/0413; F04D 29/0473; F04D 13/10; F04D 13/06; F04D 29/12; F04D 29/2266; F05D 2240/55
See application file for complete search history.

(56) References Cited

U.S. PATENT DOCUMENTS 2,251,020 A * 7/1941 Murphy ................ F04D 29/049
277/389
4,082,380 A * 4/1978 Klaus .................. F04D 29/0413
384/425

(Continued)

FOREIGN PATENT DOCUMENTS

WO WO-2004092539 A1 * 10/2004 ........... E21B 43/126
WO WO-2017030931 A1 * 2/2017 ............. F16J 15/185

*Primary Examiner* — Nathaniel E Wiehe
*Assistant Examiner* — Andrew J Marien
(74) *Attorney, Agent, or Firm* — Bracewell LLP; James E. Bradley (57) ABSTRACT

A submersible well pump assembly has a motor that rotates a drive shaft within the pump. The pump has a number of pump stages, each stage having a diffuser and an impeller. A bushing is fixed for non-rotation within the diffuser. A thrust runner sleeve mounted to the drive shaft has an outer diameter surface in sliding rotating engagement with an inner diameter surface of the bushing. At least one seal ring is mounted to the sleeve in sealing engagement with the drive shaft to block the entry of well fluid particulates between the sleeve and the drive shaft.

20 Claims, 4 Drawing Sheets

(51) Int. Cl.
*F16J 15/3284* (2016.01)
*F04D 1/06* (2006.01)
*F04D 13/10* (2006.01)
*F04D 29/041* (2006.01)
*F04D 29/047* (2006.01)
*F04D 29/08* (2006.01)
*F04D 29/10* (2006.01)
*F04D 29/62* (2006.01)

(52) U.S. Cl.
CPC ....... *F04D 29/2266* (2013.01); *F04D 29/628* (2013.01); *F05D 2240/55* (2013.01)

(56) References Cited

U.S. PATENT DOCUMENTS

| | | | |
|---|---|---|---|
| 5,722,842 A | 3/1998 | Cairns | |
| 6,068,444 A * | 5/2000 | Sheth | F04D 1/06 415/104 |
| 6,234,748 B1 * | 5/2001 | Brown | F04D 29/0413 415/170.1 |
| 7,575,413 B2 * | 8/2009 | Semple | F04D 1/063 415/107 |
| 7,987,913 B2 | 8/2011 | Parmeter et al. | |
| 9,353,752 B2 | 3/2016 | Tetzlaff et al. | |
| 9,500,202 B1 * | 11/2016 | Davis | F04D 1/06 |
| 9,593,777 B2 * | 3/2017 | Abarca Melo | F04D 29/126 |
| 10,145,380 B1 * | 12/2018 | Davis | F04D 29/041 |
| 2012/0263610 A1 | 10/2012 | Tetzlaff et al. | |
| 2015/0023815 A1 * | 1/2015 | Tetzlaff | F04D 1/04 417/365 |
| 2015/0226219 A1 * | 8/2015 | Johnson | F04D 1/06 417/423.3 |
| 2016/0115998 A1 * | 4/2016 | Jayaram | F04D 13/10 417/423.3 |
| 2017/0002823 A1 * | 1/2017 | Gahlot | F04D 13/10 |

* cited by examiner

SEAL ASSEMBLY FOR ABRASION RESISTANT BEARING OF CENTRIFUGAL PUMP

CROSS REFERENCE TO RELATED APPLICATION

Applicant claims priority to provisional application Ser. No. 62/298,148, filed Feb. 22, 2016.

FIELD OF THE DISCLOSURE

This disclosure relates in general to electrical submersible well pumps and in particular to a centrifugal pump having impeller and diffuser stages with abrasion resistant bearings, each of the bearings having a seal assembly to prevent the entry of sand between a sleeve and drive shaft.

BACKGROUND

Electrical submersible pumps (ESP) are widely used to pump oil production wells. A typical ESP has a rotary pump driven by an electrical motor. A seal section is located between the pump and the motor to seal dielectric motor lubricant from the well fluid. The seal section may have components to reduce the differential between the well fluid pressure on the exterior of the motor and the lubricant pressure within the motor. A drive shaft, normally in several sections, extends from the motor through the seal section and into the pump for rotating the pump. The pump may be a centrifugal pump having a large number of stages, each stage having an impeller and diffuser.

During operation, the impellers create thrust, which can be both in downward and upward directions. The impellers transmit the thrust in various manners to the diffusers. Some pumps are particularly used in abrasive fluid environments. In those pumps, a thrust runner sleeve is coupled to the shaft to receive down thrust from one or more impellers. A key fits within an axially extending groove in the inner diameter of the thrust runner sleeve and an axially extending groove on the outer diameter of the drive shaft. A bushing secured into a receptacle in the diffuser receives the down thrust and transfers the down thrust to the diffuser. The thrust runner sleeve and the bushing may be formed of an abrasion resistant material, such as tungsten carbide, that is harder than the material of the shaft and the diffuser. The bushing is commonly installed in the receptacle with a press fit.

In wells with extensive sand or well fluid particulate production, wear of the key and shaft wear is a common problem. The sand particles and other abrasives may be smaller than the clearances between the key and the axially extending mating grooves. These particulates can be trapped and cause fretting wear due to torsional vibration. The drive shaft and key are generally of softer material then the material of the sleeve, causing the fretting wear to be more severe in the key and the drive shaft. When the key cannot continue to hold the torque between the drive shaft and the sleeve, it may shear off. The wear then translates from fretting into abrasion between the drive shaft and the sleeve, which accelerates the material removal from the drive shaft. Finally, mechanical shock may break the sleeve or the reduced shaft diameter may no longer be able to deliver the torque required.

SUMMARY

A submersible well pump assembly has a pump and a motor. A rotatable drive shaft driven by the motor extends within the pump. The pump has a plurality of pump stages, each having a diffuser and an impeller driven by the drive shaft. A bushing is fixed for non-rotation in the diffuser, the bushing having an inner diameter surface. A thrust runner sleeve mounted to the drive shaft for rotation therewith has an outer diameter surface in sliding rotating engagement with the inner diameter surface of the bushing. At least one seal ring is mounted to the sleeve for rotation therewith. The seal ring is of a polymer material and has an inner diameter surface in sealing engagement with the drive shaft to block the entry of well fluid particulates between the sleeve and the drive shaft.

In the embodiment shown, the seal ring is mounted in an upper portion of an inner diameter surface of the sleeve. An axially extending seal ring groove is in the inner diameter surface of the seal ring. An axially extending sleeve groove is in an inner diameter surface of the sleeve. An axially extending drive shaft groove is on an outer diameter surface of the drive shaft. A key locates in the drive shaft groove, the sleeve groove, and the seal ring groove to cause the sleeve and the seal ring to rotate in unison with the drive shaft.

The sleeve may have an annular groove at an upper end of the sleeve. The seal ring is located in the annular groove.

In one embodiment, the seal ring has a flange overlying an upper end of the sleeve that is configured to receive thrust from the impeller and transfer the thrust to the upper end of the sleeve. In another embodiment, the seal ring has an upper side that is flush with an upper end of the sleeve and has a perimeter spaced radially inward from an outer periphery of the upper end of the sleeve.

The embodiments illustrate an upper seal ring and a lower seal ring. The upper seal ring may be located at an upper end of the sleeve. The lower seal ring may be located at a lower end of the sleeve.

In one embodiment, an annular upper seal ring groove is located at an upper end of the sleeve. The upper seal ring groove having an open upper side. An upper seal ring is located in the upper seal ring groove and has an upper side flush with the upper end of the sleeve. An annular lower seal ring groove is at a lower end of the sleeve. The annular lower seal ring groove has an open lower side. A lower seal ring is located in the annular lower seal ring groove and has a lower side flush with the lower end of the sleeve.

In another embodiment, the seal ring annular groove has a curved base that faces radially inward relative to the axis. The seal ring is located in the seal ring annular groove. The seal ring has a D-shaped configuration when viewed in transverse cross section, with an outer side that is flat, faces outward and is radially spaced from the base.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
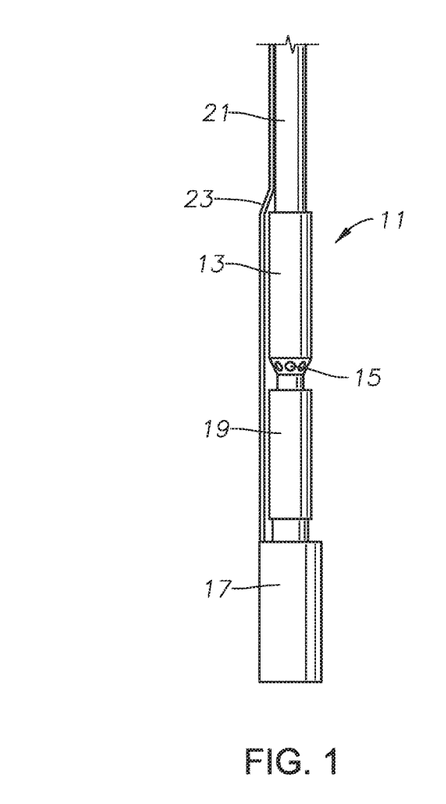
FIG. 1 is a side view of an electrical submersible well pump assembly having a pump in accordance with this disclosure.

FIG. 1 illustrates a submersible well pump assembly (ESP) 11 that includes a pump 13 with an intake 15. A motor 17, which is typically a three-phase electrical motor, drives pump 13. An upper end of motor 17 connects to a seal section 19 that seals dielectric lubricant in motor 17. Also, seal section 19 may have a pressure equalizing element to equalize the pressure of the lubricant in motor 17 with the hydrostatic pressure of the well fluid on the exterior of motor 17. A string of production tubing 21 supports ESP 11 in a well in this example. A power cable with a motor lead 23 on its lower end extends alongside tubing 21 to supply electrical power to motor 17.

Figure 2:
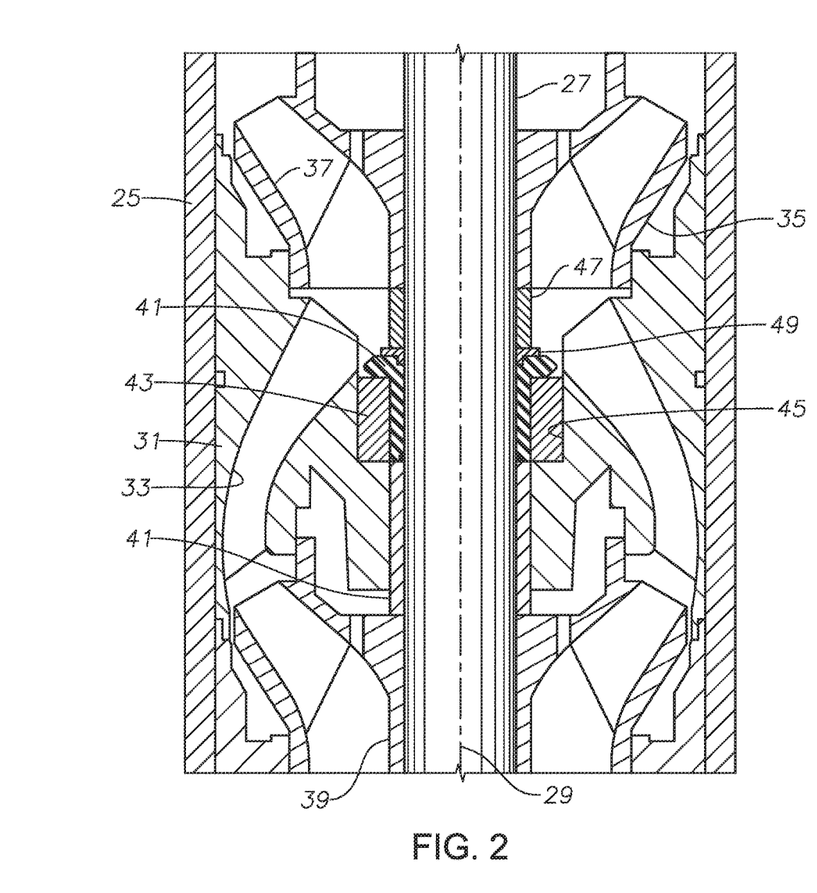
FIG. 2 is a sectional view of a stage of the pump of FIG. 1, illustrating a seal assembly and abrasion resistant components in accordance with this disclosure.

Referring to FIG. 2, pump 13 has a tubular housing 25 and a rotatable drive shaft 27 located on a longitudinal axis 29 of housing 25. Pump 13 is a centrifugal type, having a large number of stages (only one complete stage shown). Each stage has a diffuser 31 that is fixed in a stack in housing 25 with other diffusers 31 so as to be non rotatable in housing 25. Each diffuser 31 has a plurality of diffuser passages 33 that extend upward and inward toward axis 29. The terms "upward", "downward" and the like are used only for convenience as ESP 11 may be operated horizontally.

An impeller 35 in each stage mounts to drive shaft 27 for rotation therewith. Impeller 35 has impeller passages 37 that extend upward and outward for delivering well fluid to the diffuser passages 33. Impeller 35 has a tubular hub 39 that receives and is keyed to drive shaft 27. The discharge of well fluid from impeller 35 creates down thrust on impeller 35 that transfers from hub 39 to a thrust runner sleeve 41. Sleeve 41 rotates in unison with drive shaft 27 but is axially movable a small amount relative to drive shaft 27. Sleeve 41 transfers the down thrust to a non rotating bushing 43, which in turn transfers the down thrust to diffuser 31 and housing 25.

A counterbore 45 on the upper side of diffuser 31 supports bushing 43 in non-rotating engagement. The fit between bushing 43 and counterbore 45 may be an interference fit. A spacer tube 47 may be mounted to drive shaft 27 between hub 39 of the next upper impeller 35 and the next lower sleeve 41 to transfer down thrust from hub 39 to sleeve 41.

Sleeve 41 and bushing 43 may be of a harder and more abrasion resistant material, such as tungsten carbide, than impellers 35, diffusers 31 and drive shaft 27. The more abrasion resistant material reduces abrasion that may otherwise occur if the well fluid has a significant sand or abrasive particle content.

In prior art pumps with abrasion resistant components, wear can still occur, particularly in the clearances between sleeve 41 and drive shaft 27. An axially extending key and groove (not shown in FIG. 1) are located between sleeve 41 and drive shaft 27 to cause sleeve 41 to rotate with drive shaft 27. Sand particles and other abrasives may be smaller than the clearances between sleeve 41 and drive shaft 27. These hard particles can be trapped in the clearances and cause fretting wear due to torsional vibration. The fretting wear can be more severe on the key and drive shaft 27, both being of materials not as hard as the material of sleeve 41. Eventually, the key may not be able to hold the torque between drive shaft 27 and sleeve 41, causing the key to shear. The wear then translates from fretting into abrasion between drive shaft 27 and sleeve 41, which accelerates the material removal from drive shaft 27. Finally the wear may cause mechanical shock to break sleeve 41, or drive shaft 27 may be unable to deliver the necessary torque.

In this disclosure, sleeve 41 has an upper seal ring 49 to block the downward entry of sand into the annular clearance between sleeve 41 and drive shaft 27. Upper seal ring 49 is a polymer, such as Teflon/glass filled or Teflon/PEEK/ Rulon. Upper seal ring 49 forms a seal between drive shaft 27 and sleeve 41 at the upper end of sleeve 41. Sleeve 41 may optionally also have a lower seal ring 50 to block upward entry of sand into the annular clearance between sleeve 41 and drive shaft 27. Lower seal ring 50 may be formed of the same material as upper seal ring 49.

Figure 3:
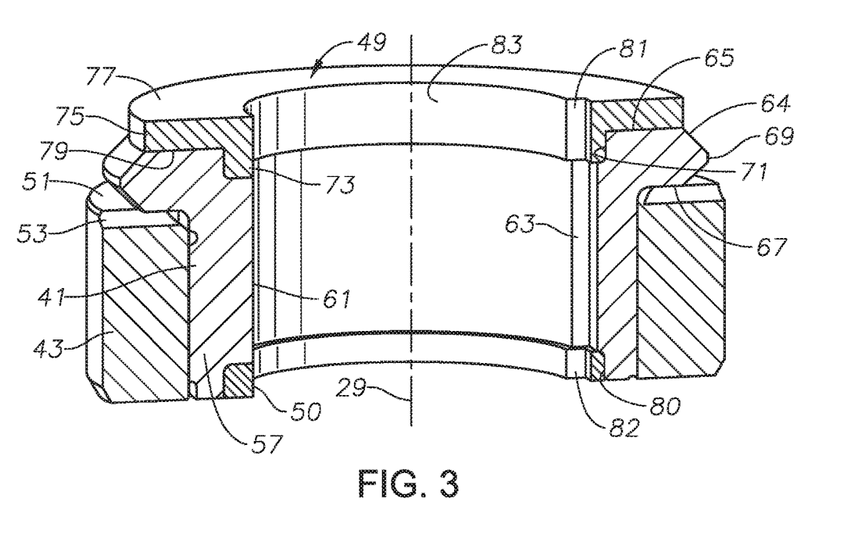
FIG. 3 is a perspective and axial sectional view of a bushing, thrust runner sleeve and seal ring of the stage of FIG. 2, shown removed from the pump.
Figure 4:
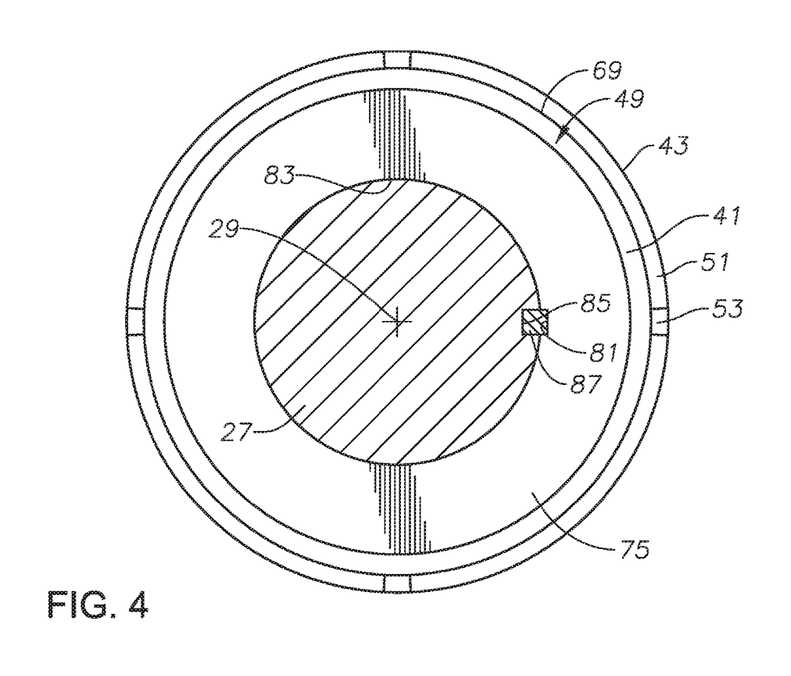
FIG. 4 is a top view of the bushing, sleeve and seal ring of FIG. 3, also showing the drive shaft in cross section.

Referring to FIG. 3, bushing 43 has an upper end 51 that is in a plane perpendicular to axis 29 and which serves as a thrust receiving surface. Upper end 51 optionally may have radial flow channels 53 for lubrication by well fluid. Bushing 43 has an inner diameter 55. Sleeve 41 has a cylindrical body portion 57 with an outer diameter 59 that is in rotational and sliding engagement with bushing inner diameter 55. Sleeve 41 has an inner diameter 61 that receives drive shaft 27 (FIG. 4). Sleeve 41 has an axially extending groove 63 in its inner diameter 61. A flange 64 extends radially outward from an upper end of sleeve cylindrical body portion 57. Flange 64 has an upper side 65 and a lower side 67, both being in planes perpendicular to axis 29. Flange upper side 65 receives down thrust from the next upper impeller 35 (FIG. 2), and flange lower side 67 transfers the down thrust to bushing upper end 51. In this example, a periphery 69 of flange 64 is V-shaped, but it could be cylindrical or other shapes.

Sleeve 41 has an annular upper seal ring groove 71 in inner diameter 61 at the upper end of sleeve 41. In this embodiment, unlike a conventional o-ring groove, upper seal ring groove 71 is not closed on both its upper and lower sides; rather the upper side of seal ring groove 71 is open and flush with flange upper side 65. An upward facing shoulder defines the lower side of seal ring groove 71, the shoulder being within sleeve inner diameter 61 a short distance below flange upper side 65.

Upper seal ring 49 has a cylindrical body portion 73 that fits snuggly within seal ring groove 71. An adhesive may be employed to bond upper seal ring 49 within seal ring groove 71. In the embodiment of FIGS. 3 and 4, upper seal ring 49 has an external seal ring flange 75 extending radially outward from the upper end of seal ring body portion 73. Seal ring flange 75 has an upper side 77 and a lower side 79, both of which are located in planes perpendicular to axis 29. Seal ring flange 75 may have an outer diameter that places the perimeter of flange 75 flush with the perimeter of sleeve flange upper side 65. Seal ring flange 75 thus overlies sleeve flange upper side 65 in this embodiment. Spacer tube 47 (FIG. 2) contacts seal ring flange upper side 77, which receives the down thrust. Seal ring flange lower side 79 transfers the down thrust to sleeve flange upper side 65. Seal ring flange 75 may serve as a damper for fluctuations in down thrust.

Lower seal ring 50 fits snuggly in an annular groove 80 formed in the lower end of sleeve 41. An adhesive may be employed to bond lower seal ring 50 in lower seal ring groove 80. Lower seal ring groove 80 is open on its lower end and is defined by a shoulder on its upper end. The lower side of lower seal ring 50 is flush with the lower side of thrust runner 41. Lower seal ring 50 has a transverse cross sectional configuration that is rectangular in this example, but other configurations are feasible.

Upper seal ring 49 has an axially extending groove 81 formed in its inner diameter 83. Axially extending groove 81 has a radial depth that is less than a transverse radial thickness of upper seal ring 49. Lower seal ring 50 has an axially extending groove 82 formed in its inner diameter. Axially extending groove 82 has a radial depth that is less than the transverse radial thickness of lower seal ring 50. Axially extending grooves 81, 82 align with sleeve axially extending groove 63. Axially extending grooves 63, 81 and 82 are typically rectangular in cross-section and mate with an axially extending groove 85 formed in drive shaft 27, as shown in FIG. 4. A rectangular or square key 87 has an inner portion that fits with drive shaft groove 85, and an outer portion of key 87 fits within aligned grooves 63, 81 and 82.

Upper seal ring inner diameter 83 may be the same as or initially slightly smaller than the outer diameter of drive shaft 27 to form a seal. Similarly, lower seal ring 50 may have an inner diameter the same as or initially slightly smaller than the outer diameter of drive shaft 27 to form a seal. The outer diameter of upper seal ring cylindrical body 73 is dimensioned to form a seal with the outer diameter of sleeve upper annular groove 71. The outer diameter of lower seal ring 50 is dimensioned to form a seal with the outer diameter of sleeve lower annular groove 80. Seal ring axially extending grooves 81 and 82 fit snuggly around the outer portion of key 87 to form a seal. The sealing engagement of upper and lower seal rings 49, 50 with drive shaft 27, sleeve 41 and key 87 need not be extensive enough to support a significant pressure differential; however, the sealing engagement is sufficient to block abrasive particles from flowing down between sleeve 41 and drive shaft 27 and up between sleeve 41 and drive shaft 27.

During operation, upper and lower seal rings 49, 50 block abrasive particles from flowing into the small annular clearance between sleeve 41 and drive shaft 27. Upper and lower seal rings 49, 50 assist in flushing the particles radially outward to the clearance between sleeve 41 and bushing 43, both of which are formed of more abrasive resistant materials than drive shaft 27. Keeping sand particles from the annular clearance between sleeve 41 and drive shaft 27 can also provide better cooling in this area.

Figure 5:
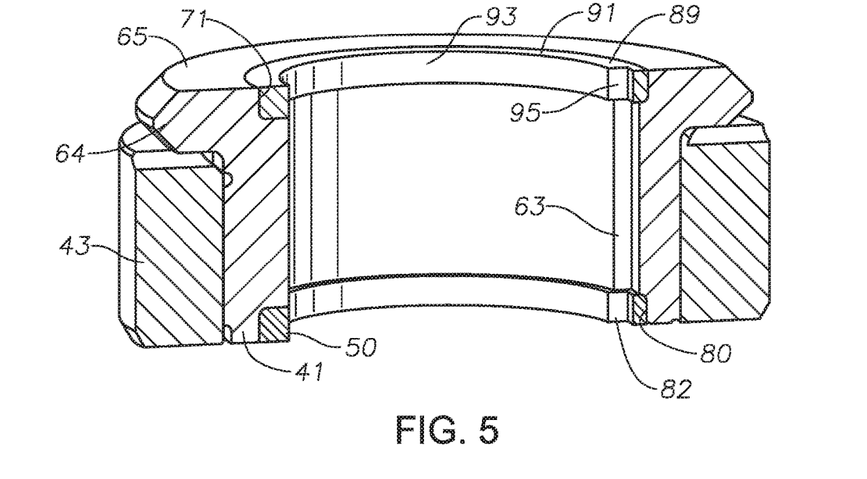
FIG. 5 is a perspective and axial sectional view of an alternate embodiment of the seal ring of the stage of FIG. 3, shown in engagement with the sleeve and removed from the pump.
Figure 6:
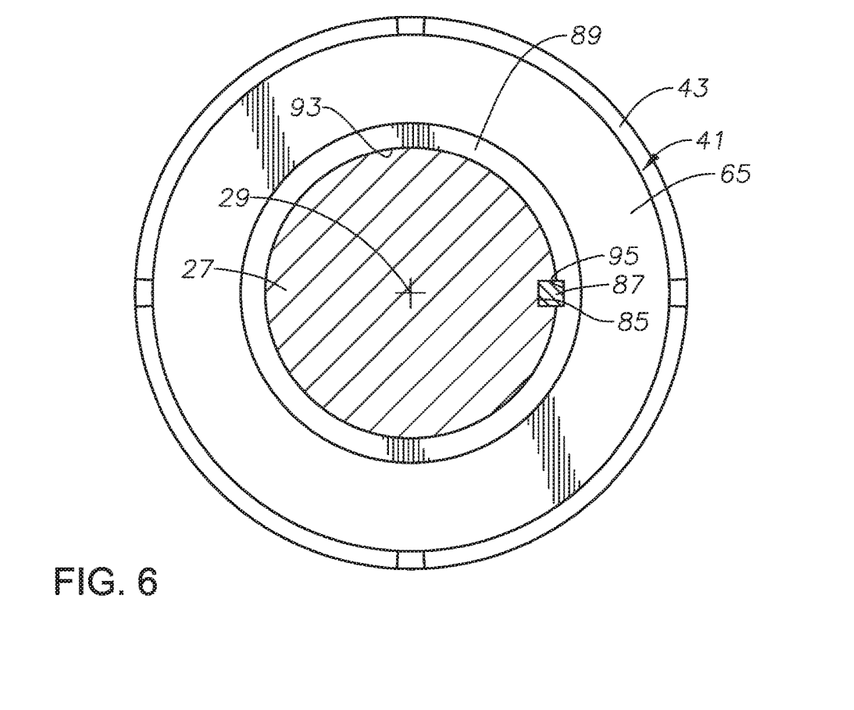
FIG. 6 is a top view of the bushing, sleeve and seal ring of FIG. 5, also showing the drive shaft in cross section.

In the alternate embodiment of FIGS. 5 and 6, the same reference numerals will be used for the components that are the same as in the first embodiment. Lower seal ring 50 and lower seal ring groove 80, if employed, may be identical to the embodiment in FIG. 3. Upper seal ring 89 is formed of a polymer that may be the same as in the first embodiment. An adhesive may be employed to bond upper seal ring 89 within sleeve upper annular groove 71. Upper seal ring 89 does not have an external flange at its upper end, unlike seal ring flange 75 of the first embodiment. Upper seal ring 89 has an upper side 91 that has an outer diameter the same as the outer diameter of sleeve upper seal ring annular groove 71. Upper side 91 may be flush with sleeve upper side 65, or it may be slightly recessed or slightly above. Spacer tube 47 (FIG. 2) has an outer diameter greater than the outer diameter of upper seal ring 89. An outer portion of the lower end of spacer tube 47 abuts sleeve upper side 65 to transfer down thrust directly to sleeve 41. The down thrust will bypass upper seal ring 89.

In this example, upper seal ring 89, like lower seal ring 50, has a rectangular transverse cross sectional configuration with a cylindrical inner diameter 93 that seals against drive shaft 27. Alternately, upper seal ring 89 and lower seal ring 50 may have other transverse cross sectional configurations, such as circular. Upper seal ring 89 has an inner diameter 93 with an axially extending groove 95 that aligns with sleeve axially extending groove 63 and with lower seal ring axially extending groove 82. Grooves 63, 95 and 82 align with drive shaft axially extending groove 87 (FIG. 6). Key 87 fits within drive shaft axially extending groove 85 and grooves 95, 63 and 82.

Figure 7:
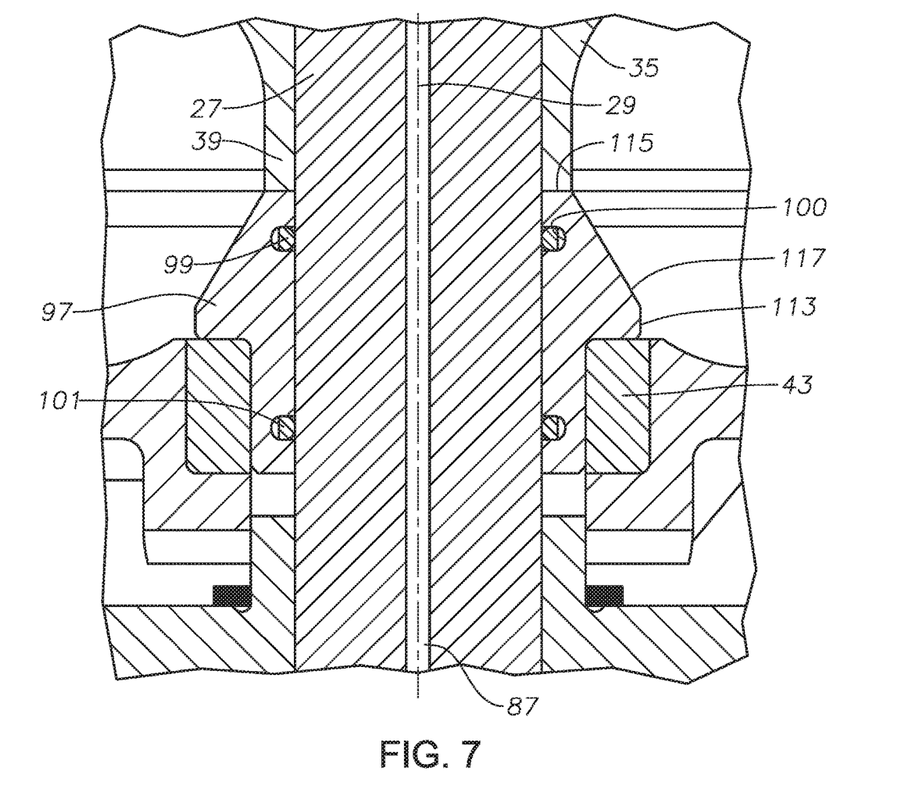
FIG. 7 is a sectional view of another embodiment of a sleeve and seal ring assembly.
Figure 8:
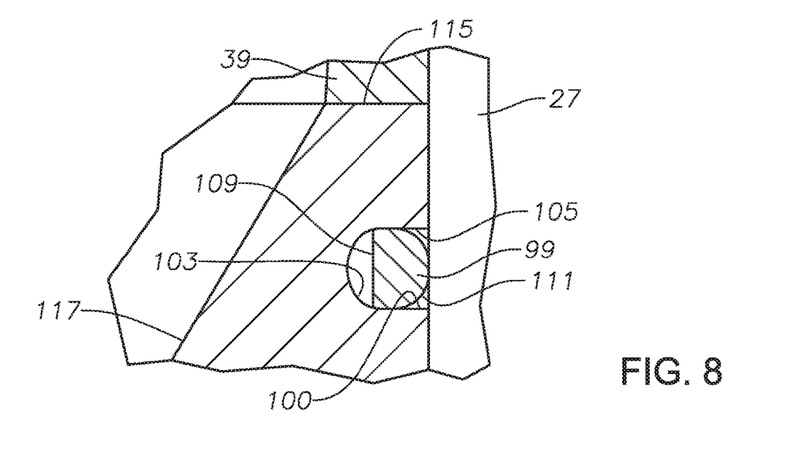
FIG. 8 is an enlarged sectional view of one of the seal rings of FIG. 7.

Referring to FIGS. 7 and 8, components that are the same as in other embodiments have the same reference numerals. Thrust runner sleeve 97 rotates with drive shaft 27 and may have two seal rings 99, 101 in its inner diameter, one above the other. Seal rings 99, 101 may be identical to each other. Each seal ring 99, 101 is located in an annular seal ring groove 100 formed in the inner diameter of sleeve 97. The upper seal ring groove 100 is in the upper portion of the inner diameter of sleeve 97, and the lower seal ring groove 100 is in the lower portion of the inner diameter of sleeve 97.

As shown in the example of FIG. 8, each seal ring groove 100 has a curved base 103 that faces radially inward and joins flat upper and lower sides 105. Upper and lower sides 105 are parallel with each other and in planes perpendicular to axis 29. Each seal ring 99, 101 fits within one of the seal ring grooves 100. In this embodiment, each seal ring 99, 101 has a flat outer side 109, when viewed in a transverse cross section, that is spaced radially inward from base 103. The radial inward side of each seal ring 99, 101 is curved in transverse cross-section, providing a "D" shape for the transverse cross section of seal ring 107.

As in the other embodiments, drive shaft key 87 (FIG. 7) extends through seal rings 99, 101. Seal rings 99, 101 may have an axial groove (not shown) similar to groove 81 in FIG. 4 for receiving key 87. Alternately seal rings 99, 101 could be split, with key 87 extending through the split. Seal rings 99, 101 may be formed of the same materials as upper and lower seal rings 49, 50 (FIG. 3) and upper seal ring 89 (FIG. 5). As in the other embodiments, each seal ring 99, 101 blocks the entry of abrasive particles from the well fluid between sleeve 97 and drive shaft 27. Seal rings 99, 101 do not provide any significant pressure or fluid sealing.

In the example of FIGS. 7 and 8, sleeve 97 has a cylindrical external flange 113 that overlies and transfers down thrust to bushing 43. Hub 39 of the next upward impeller 35 abuts an upper end 115 of sleeve 97 to transfer down thrust. A conical surface 117 on the exterior of sleeve 97 extends from flange 113 to upper end 115. This embodiment optionally does not use a spacer tube, such as spacer tube 47, between impeller hub 39 and sleeve 97.

Upper seal ring 99 is spaced below upper end 115 a short distance. Lower seal ring 101 is spaced above the lower end of sleeve 97 about the same distance. The distance between upper and lower seal rings 99, 101 is greater than the distance from upper seal ring 99 to upper end 115. Also, the distance between seal rings 99, 101 is greater than the distance from the lower end of sleeve 97 to lower seal ring 101. Upper seal ring 99 blocks downward migrating abrasive particles between sleeve 97 and drive shaft 27. Lower seal ring 101 blocks upward migrating abrasive particles between sleeve 97 and drive shaft 27.

The present invention described herein, therefore, is well adapted to carry out the objects and attain the ends and advantages mentioned, as well as others inherent therein. While a few embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A submersible well pump assembly, comprising:
a pump;
a motor;
a rotatable drive shaft driven by the motor and extending within the pump along a longitudinal axis of the pump;
a plurality of pump stages in the pump, each of the stages comprising:
a diffuser;
an impeller driven by the drive shaft;
a bushing fixed for non-rotation in the diffuser, the bushing having an inner diameter surface;
a thrust runner sleeve mounted to the drive shaft for rotation therewith, the sleeve having an outer diameter surface in sliding rotating engagement with the inner diameter surface of the bushing; and
at least one seal ring mounted to the sleeve for rotation in unison with the drive shaft and the sleeve, the seal ring being of a polymer material, in sealing engagement with the sleeve, and having an inner diameter surface in sealing engagement with the drive shaft to block the entry of well fluid particulates between the sleeve and the drive shaft.

2. The assembly according to claim 1, wherein:
the seal ring is mounted in an upper portion of an inner diameter surface of the sleeve.

3. The assembly according to claim 1, further comprising:
an axially extending seal ring groove in the inner diameter surface of the seal ring;
an axially extending sleeve groove in an inner diameter surface of the sleeve;
an axially extending drive shaft groove on an outer diameter surface of the drive shaft; and
a key that locates in the drive shaft groove, the sleeve groove, and the seal ring groove to cause the sleeve and the seal ring to rotate in unison with the drive shaft.

4. The assembly according to claim 1, wherein:
the sleeve has an annular groove at an upper end of the sleeve; and
the seal ring is located in the annular groove.

5. The assembly according to claim 1, wherein:
the seal ring has a flange overlying an upper end of the sleeve that is configured to receive thrust from the impeller and transfer the thrust to the upper end of the sleeve.

6. The assembly according to claim 1, wherein:
the seal ring has an upper side that is flush with an upper end of the sleeve and has a perimeter spaced radially inward from an outer periphery of the upper end of the sleeve.

7. The assembly according to claim 1, wherein:
said at least one seal ring comprises an upper seal ring and a lower seal ring.

8. The assembly according to claim 7, further comprising:
an annular upper seal ring groove at an upper end of the sleeve, the upper seal ring groove having an open upper side;
the upper seal ring being located in the upper seal ring groove and having an upper side flush with the upper end of the sleeve;
an annular lower seal ring groove at a lower end of the sleeve, the annular lower seal ring groove having an open lower side; and
the lower seal ring being located in the annular lower seal ring groove and having a lower side flush with the lower end of the sleeve.

9. The assembly according to claim 1, further comprising:
a seal ring annular groove within an inner diameter surface of the sleeve, the seal ring annular groove having a curved base that faces radially inward relative to the axis; wherein
the seal ring is located in the seal ring annular groove; and
the seal ring has a D-shaped configuration when viewed in transverse cross section, with an outer side that is flat, faces outward and is radially spaced from the base.

10. A submersible well pump assembly, comprising:
a pump;
a motor;
a rotatable drive shaft driven by the motor and extending within the pump along a longitudinal axis of the pump;
a plurality of pump stages in the pump, each of the stages comprising:
a diffuser;
an impeller driven by the drive shaft;
a bushing fixed for non-rotation in the diffuser, the bushing having an inner diameter surface and an upper end;
a thrust runner sleeve having an inner diameter surface that receives an outer diameter surface of the drive shaft, the sleeve having an outer diameter surface in sliding rotating engagement with the inner diameter surface of the bushing and a thrust transferring shoulder for transferring down thrust to the upper end of the bushing;
an axially extending groove in the inner diameter surface of the sleeve;
an annular upper seal ring groove in an upper portion of the inner diameter surface of the sleeve;
an upper seal ring mounted in the annular upper seal ring groove for rotation with the sleeve, the upper seal ring being of a polymer material and having an inner diameter surface in sealing engagement with the drive shaft to block the entry of well fluid particulates between the sleeve and the drive shaft;

an axially extending groove in the outer diameter surface of the drive shaft;
an axially extending groove in the inner diameter surface of the upper seal ring that aligns with the axially extending groove in the inner diameter surface of the sleeve; and
a key in mating engagement with the axially extending grooves in the drive shaft, the upper seal ring, and the sleeve, to cause the sleeve and the upper seal ring to rotate in unison with the drive shaft.

11. The assembly according to claim 10, wherein:
the axially extending groove in the inner diameter surface of the upper seal ring has a radial depth less than a radial thickness of the upper seal ring.

12. The assembly according to claim 10, wherein:
the upper seal ring has a flange overlying an upper end of the sleeve that is configured to receive down thrust from the impeller and transfer the down thrust to the upper end of the sleeve.

13. The assembly according to claim 10, wherein:
the upper seal ring groove has an open upper side; and
the upper seal ring has an upper side flush with an upper end of the sleeve.

14. The assembly according to claim 10, further comprising:
an annular lower seal ring groove in the inner diameter surface of the sleeve at a lower end of the sleeve, the lower seal ring groove having an open lower side; and
the lower seal ring being located in the lower seal ring groove and having a lower side flush with the lower end of the sleeve.

15. The assembly according to claim 14, further comprising:
an axially extending groove in the inner diameter surface of the lower seal ring that aligns with the axially extending grooves in the inner diameter surface of the sleeve and in the inner diameter surface of the upper seal ring; and wherein the key is also in engagement with the axially extending groove in the inner diameter surface of the lower seal ring.

16. The assembly according to claim 10, wherein:
the annular upper seal ring groove has a curved base that faces radially inward relative to the axis; and
the upper seal ring has a D-shaped configuration when viewed in transverse cross section, with an outer side that is flat, faces outward and is radially spaced from the base.

17. A submersible well pump assembly, comprising:
a pump;
a motor;
a rotatable drive shaft driven by the motor and extending within the pump along a longitudinal axis of the pump;
a plurality of pump stages in the pump, each of the stages comprising:
a diffuser;
an impeller driven by the drive shaft;
a bushing fixed for non-rotation in the diffuser, the bushing having an inner diameter surface, an upper end for receiving down thrust from the impeller and a thrust transferring surface for transferring down thrust to the diffuser;
a thrust runner sleeve having an inner diameter surface that receives an outer diameter surface of the drive shaft, the sleeve having an outer diameter surface in sliding rotating engagement with the inner diameter surface of the bushing, the sleeve having an upper end for receiving down thrust from the impeller and a thrust transferring shoulder for transferring down thrust to the upper end of the bushing;
an axially extending groove in the inner diameter surface of the sleeve;
an annular seal ring groove at the upper end of the sleeve in the inner diameter surface of the sleeve, the annular seal ring groove having an open upper side;
a seal ring mounted in the annular seal ring groove for rotation with the sleeve, the seal ring being of a polymer material and having an inner diameter surface in sealing engagement with the drive shaft to block the entry of well fluid particulates between the sleeve and the drive shaft;
an axially extending groove in the outer diameter surface of the drive shaft;
an axially extending groove in the inner diameter surface of the seal ring that aligns with the axially extending groove in the inner diameter surface of the sleeve; and
a key in mating engagement with the axially extending grooves in the drive shaft, the seal ring, and the sleeve, to cause the sleeve and the upper seal ring to rotate in unison with the drive shaft.

18. The assembly according to claim 17, wherein:
the axially extending groove in the inner diameter surface of the seal ring has a radial depth less than a radial thickness of the seal ring.

19. The assembly according to claim 17, wherein:
the seal ring has a flange overlying the upper end of the sleeve that is configured to receive down thrust from the impeller and transfer the down thrust to the upper end of the sleeve.

20. The assembly according to claim 17, wherein:
the seal ring has an upper side that is located in a common plane with the upper end of the sleeve.

* * * * *